US010498427B2

(12) United States Patent
Faerber et al.

(10) Patent No.: US 10,498,427 B2
(45) Date of Patent: Dec. 3, 2019

(54) METHODS FOR RADIO COMMUNICATION AND COMMUNICATION DEVICES

(71) Applicant: Intel IP Corporation, Santa Clara, CA (US)

(72) Inventors: Michael Faerber, Wolfratshausen (DE); Ingolf Karls, Feldkirchen (DE); Maria Fresia, Munich (DE); Kilian Roth, Munich (DE); Honglei Miao, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/753,996

(22) PCT Filed: Aug. 5, 2016

(86) PCT No.: PCT/US2016/045677
§ 371 (c)(1),
(2) Date: Feb. 21, 2018

(87) PCT Pub. No.: WO2017/044219
PCT Pub. Date: Mar. 16, 2017

(65) Prior Publication Data
US 2018/0248610 A1    Aug. 30, 2018

(30) Foreign Application Priority Data
Sep. 7, 2015  (DE) .................. 10 2015 114 975

(51) Int. Cl.
H04B 7/06    (2006.01)
H04B 7/08    (2006.01)
(Continued)

(52) U.S. Cl.
CPC .............. *H04B 7/08* (2013.01); *H01Q 1/246* (2013.01); *H01Q 25/002* (2013.01);
(Continued)

(58) Field of Classification Search
CPC ........ H04B 7/08; H04B 7/0617; H04B 7/086; H01Q 1/246; H01Q 25/002; H04W 84/042
See application file for complete search history.

(56) References Cited

U.S. PATENT DOCUMENTS

2001/0000959 A1* 5/2001 Campana, Jr. ..... G08B 21/0222
340/573.1
2002/0132581 A1* 9/2002 Ichihara ................. H01Q 3/446
455/25

(Continued)

FOREIGN PATENT DOCUMENTS

WO    2013125993 A1    8/2013

OTHER PUBLICATIONS

Hur et al, "Multilevel millimeter wave beamforming for wireless backhaul," in 2011 IEEE Global Telecommunications Conference, Dec. 5-9, 2011,p. 253-257, Houston, 'TX, USA.
(Continued)

Primary Examiner — Syed Haider
(74) Attorney, Agent, or Firm — Viering, Jentschura & Partner mbB

(57) ABSTRACT

A method for radio communication is described comprising receiving a millimeter wave signal via a radio communication from a transmit antenna by means of a receive antenna, wherein at least one of the transmit antenna and the receive antenna is a directional antenna with adjustable directivity, determining a reception quality of the millimeter wave signal as received by the receive antenna for a first directivity of the directional antenna, reducing the directivity of the directional antenna to a second directivity based on whether the reception quality is above a required reception quality and continuing the radio communication with the second directivity.

22 Claims, 11 Drawing Sheets

(51) Int. Cl.
*H01Q 1/24* (2006.01)
*H01Q 25/00* (2006.01)
*H04W 84/04* (2009.01)

(52) U.S. Cl.
CPC ........... *H04B 7/0617* (2013.01); *H04B 7/086* (2013.01); *H04W 84/042* (2013.01)

(56) References Cited

U.S. PATENT DOCUMENTS

| | | | | |
|---|---|---|---|---|
| 2004/0067775 | A1* | 4/2004 | Dalal | H01Q 1/246 455/562.1 |
| 2006/0050005 | A1 | 3/2006 | Shirosaka et al. | |
| 2006/0068719 | A1* | 3/2006 | Hairapetian | H04B 7/0632 455/69 |
| 2007/0054617 | A1* | 3/2007 | Nikolajevic | H04B 7/0619 455/41.2 |
| 2010/0295730 | A1* | 11/2010 | Jeon | H04B 7/0686 342/372 |
| 2013/0122820 | A1* | 5/2013 | Horio | H04B 17/364 455/67.11 |
| 2015/0244478 | A1* | 8/2015 | Shirakata | H04B 17/309 370/252 |
| 2016/0056904 | A1* | 2/2016 | Sakaguchi | H04B 17/309 370/252 |

OTHER PUBLICATIONS

Degli-Esposti et al, "Ray-Tracing-Based mm-Wave Beamforming Assessment", IEEE Access Year: 2014, Nov. 11, 2014, p. 1314-1325, vol. 2.
International Search Report based on application No. PCT/US2016/045677 (3 pages) dated Nov. 7, 2016 (for reference purpose only).
German Office Action based on application No. 10 2015 114 975.3 (10 pages) dated Apr. 20, 2016 (for reference purpose only).

* cited by examiner

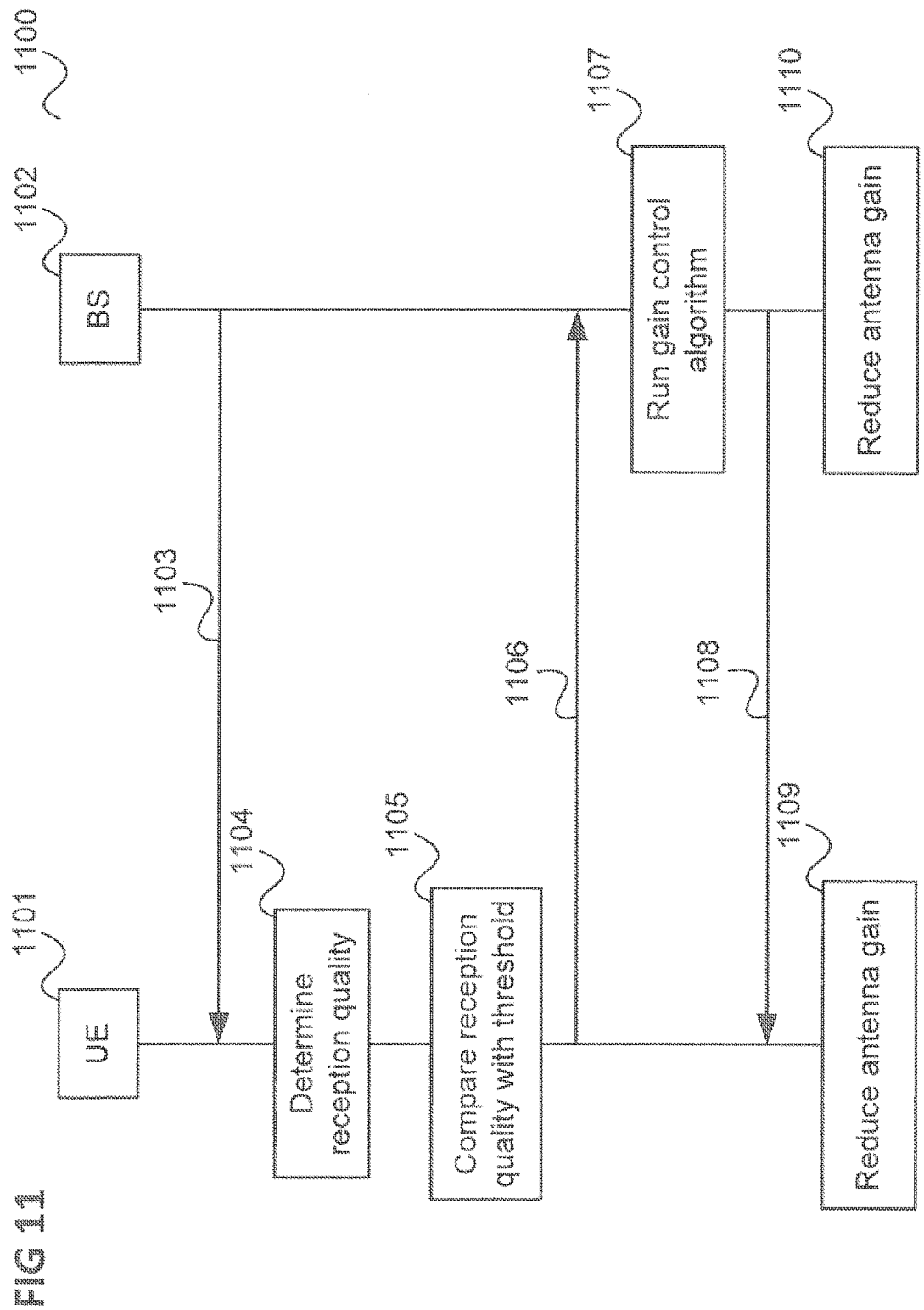

METHODS FOR RADIO COMMUNICATION AND COMMUNICATION DEVICES

RELATED APPLICATIONS

The present application is a national stage entry according to 35 U.S.C. § 371 of PCT application No.: PCT/US2016/045677 filed on Aug. 5, 2016, which claims priority from German application No.: 10 2015 114 975.3 filed on Sep. 7, 2015, and is incorporated herein by reference in its entirety.

TECHNICAL FIELD

Embodiments described herein generally relate to methods for radio communication and communication devices.

BACKGROUND

To increase the throughput in cellular communication systems, the usage of millimeter (mm) wave signals for radio transmission is considered. Since millimeter wave signals are typically more vulnerable to propagation loss than radio signals of longer wavelengths, the usage of directional antennas, i.e. beam forming, is considered, which however requires a mechanism to align the transmitter and the receiver antenna. Approaches to allow the efficient usage of beam forming are therefore desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 11 shows an example for a message flow between a communication terminal and a base station for antenna gain control.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
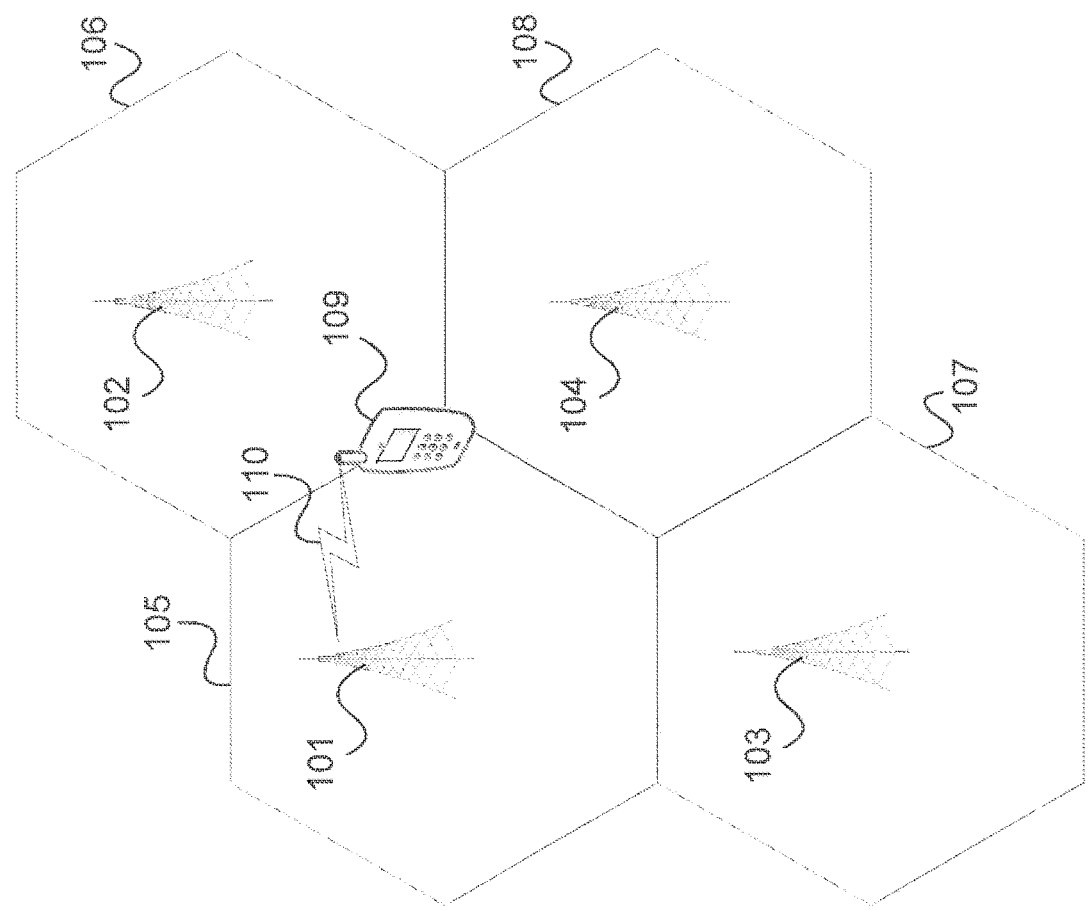
FIG. 1 shows a cellular communication system.

FIG. 1 shows a cellular communication system 100.

The cellular communication system includes a radio access network including a plurality of base stations 101-104, wherein each base station 101-104 operates a radio cell 105-108. A communication terminal (i.e. a subscriber terminal) 109 located in one of the radio cells, in this example a first radio cell 105 operated by a first base station 101, may communicate via a radio communication connection 110 with the first base station 101 to exchange data with the radio access network and for getting access to other networks connected to the radio access network, e.g. a core network of the cellular communication system 100 or the Internet.

There are multiple generations of cellular communication systems, such as 2G such as GSM (Global System for Mobile Communications), 3G such as UMTS (Universal Mobile Telecommunications System) and 4G such as LTE (Long Term Evolution). For fifth generation, 5G, there are concepts considering significant data throughput improvements by the use of millimeter wave spectrum and large bandwidth carriers. The millimeter wave radio resource may be shared between backhaul, front haul and access links. The millimeter wave technology is intended for spectrum with an absolute radio frequency so high that the spectrum range is well suited to offer very large bandwidths. However, the targeted frequency ranges have difficult propagation conditions, mainly caused by the higher absolute radio frequency and the increased propagation loss, on top we have an atmospheric impact. Suggested bands e.g. in the 20-30 and 60 GHz bands are sensitive to H2O and O2 absorption effects as illustrated in FIG. 2.

Figure 2:
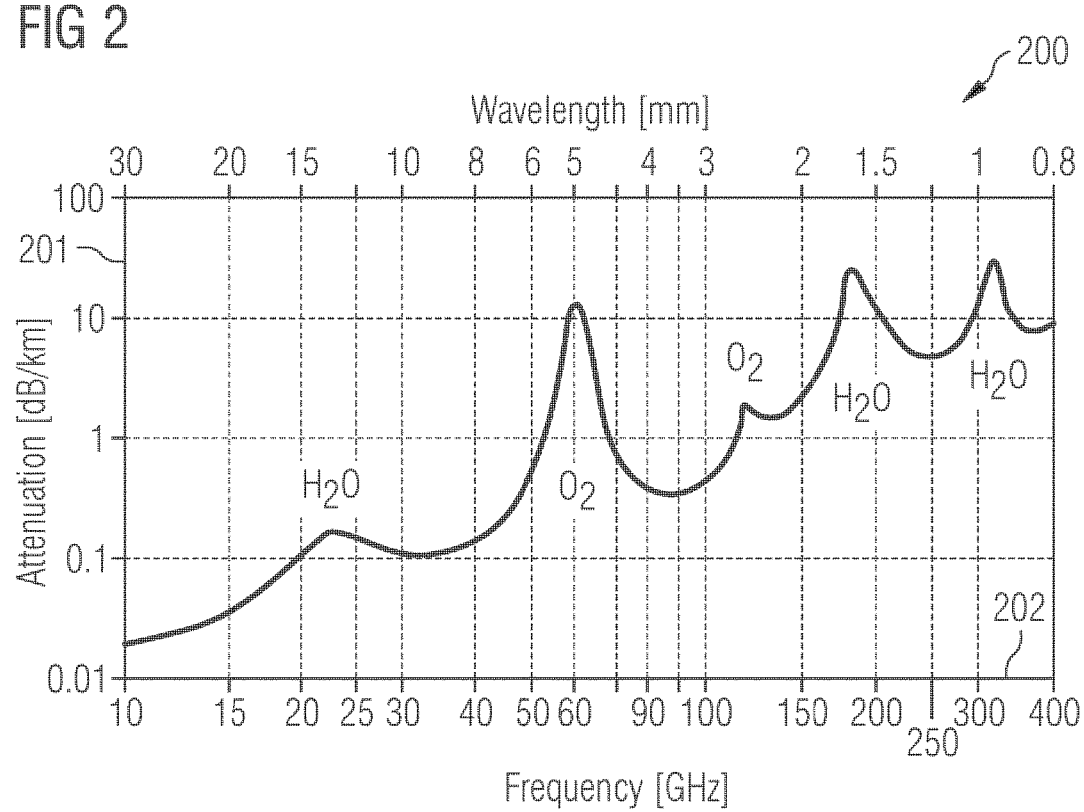
FIG. 2 shows a diagram indicating attenuation for the millimeter wave spectrum.

FIG. 2 shows a diagram 200 indicating attenuation (indicated along the vertical axis 201) depending on frequency (indicated along the horizontal axis 202) for the mm wave spectrum.

Figure 3:
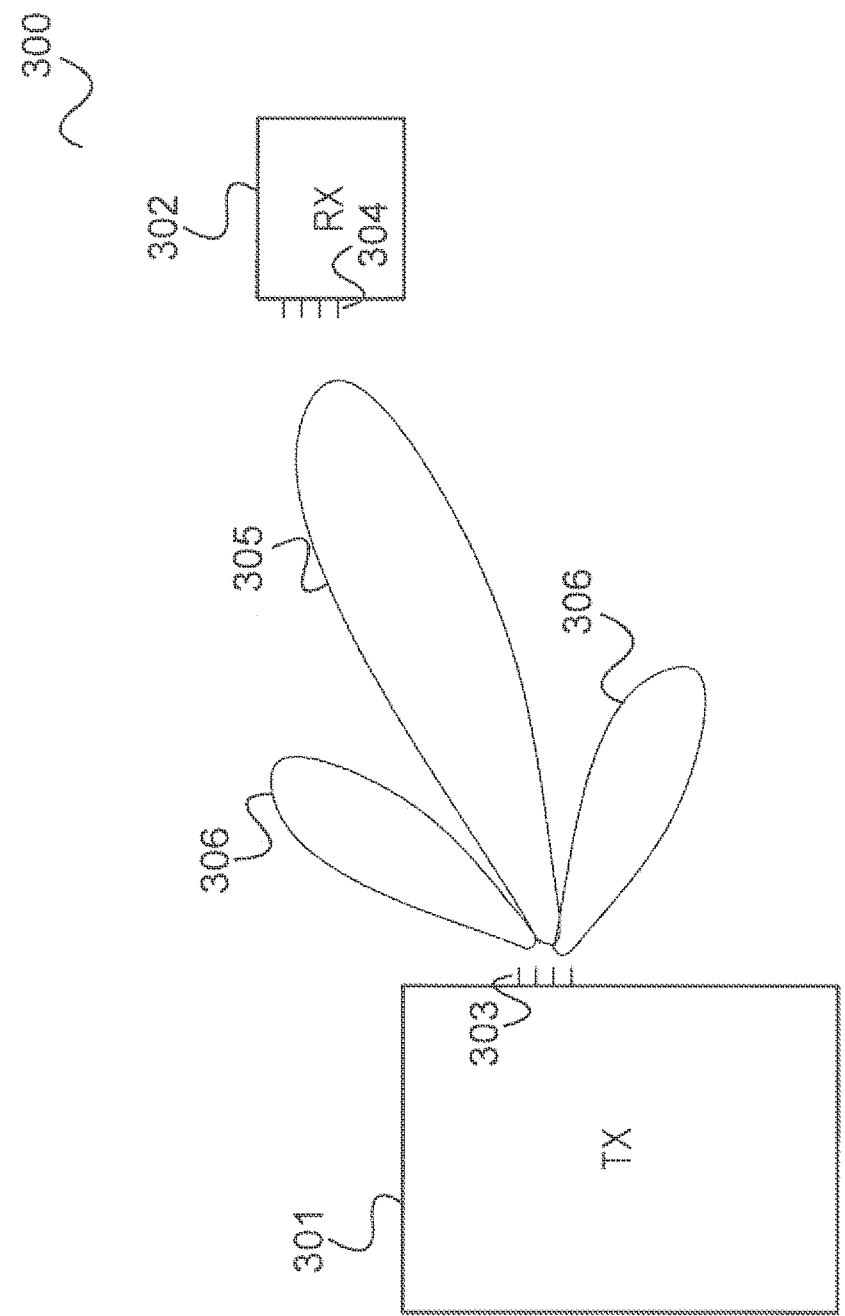
FIG. 3 shows a communication arrangement.

On the other hand, the small wavelengths allow the creation of small size high directional high gain antennas by means of beam forming as illustrated in FIG. 3.

FIG. 3 shows a communication arrangement 300.

The communication arrangement 300 includes a transmitter 301 (e.g. corresponding to one of the first base station 101 and the communication terminal 109) and a receiver 302 (e.g. corresponding to the other of the first base station 101 and the communication terminal 109).

The transmitter 301 includes a directional transmit antenna 303 formed of a plurality of antennas (exciter elements) and the receiver 302 includes a directional receive antenna 304 formed of a plurality of antennas (exciter elements). By setting a phase shift between the antennas forming transmit antenna 303, the transmitter 301 may perform beam forming for a transmit signal such that the antenna gain strongly depends on the angle under which the transmitter is seen (in other words the signal strength depends on the angle of departure from the transmitter 301). In this example, the gain is very high for the direction of a main lobe 305 (as represented by its size), medium for the direction of side lobes 306 and very small for all other directions. Similarly, the receiver 302 may, by setting a phase shift between the antennas forming the receive antenna 304, perform beam forming to make the receive antenna gain dependent from the angle of arrival of a signal.

By beam forming, high antenna gains can be achieved for certain directions. These high antenna gains allow compensating the additional path loss for millimeter waves but require that the transmitter (TX) angle of departure (AoD) of the main lobe 305 is perfectly matching the desired receiver (Rx) angle of arrival (AoA), i.e. the angle of arrival for which the receive antenna gain is high.

To maximize the possible distance between the transmitter 301 and the receiver 302 both have directional antennas 303, 304. For the application to a cellular communication system, this implies that both the base stations 101-104 as well as the subscriber terminals have directional steerable millimeter wave antennas.

A high gain antenna, such as the transmit antenna 303 and the receive antenna 304 are typically composed of an array of exciter elements and by phase shifting devices and adjustment means for the phase shifts between the exciter elements. For back haul and front haul installations, the beam (e.g. main lobe 305) can be steered over a certain (angular) range, without mechanical work (by phase shifting) and can be considered to be more and less static between the connected points (e.g. transmitter 301 and receiver 302).

For user access, i.e. the radio connection 110 between a communication terminal 109 used by a human user, it should be noted that a millimeter wave radio link may strongly vary depending on short term variations caused by the movement of the user. This may be taken into account by a real-time tracking of the beam taking the dynamics of the link channel conditions and the required throughput of the radio connection 110, including reference signal patterns, into account. However, for this, a highly responsive feedback loop is typically required to keep the directive antennas of the base station 101 and the subscriber terminal 109 aligned (i.e. pointed at each other). For example, a feedback loop is formed by the communication terminal 109 reporting a reception quality indication to the base station 101 and the base station 101 accordingly updates the alignment between the transmit antenna 303 and the receiver antenna 304, i.e. updates the direction of the antenna gain pattern of the transmit antenna 303 (i.e. the direction of the main lobe 305) and instructs the communication terminal 109 to update the direction of the antenna gain pattern of the receive antenna 304 to be aligned with each other.

Assuming a constant tracking (i.e. alignment of the directive antennas of the transmitter 301 and the receiver 302) the link budget formula is given as $$L_p^{max} = \frac{P_T}{P_R} \times G_T \times G_R \quad (1)$$

where
$L_p^{max}$ is the maximum pathloss that the system can accept (also referred to as maximum achievable link budget), i.e. the maximum pathloss at which the receiver 302 can still successfully (e.g. at a predetermined minimum performance) receive a signal transmitted by the transmitter.
$P_T$ is the transmit power of the signal
$P_R$ is the minimum received power at which the receiver 302 can still successfully (at the predetermined minimum performance) receive the signal
$G_T$ is the antenna gain of the transmit antenna
$G_R$ is the transmit gain of the receive antenna.

$L_p^{max}$ can be used to determine the maximum range between the transmitter 301 and the receiver according to $$d = 10^{\frac{L_p^{max} - L_o}{n \times 10}} \quad (2)$$

where d is the distance between the transmitter 301 and the receiver 302
Lo is the pathloss normalized to 1 meter (depending on frequency)
n is a decay factor of the radio wave (dependent on the radio channel)

Beam tracking algorithms (i.e. antenna alignment algorithms) may be based on closed loop feedback techniques. For high gain narrow beam implementations, a low latency feedback loop is required. Furthermore, means are needed to achieve an accurate tracking and prediction. High accurate tracking and low latency typically requires significant bandwidth of a radio connection, which reduces the payload capacity of the radio connection. For static backhaul/front haul connections, algorithms have only to deal with rainfall, foliage and environmental changes, which are of slow nature, and keep the bandwidth requirements reasonable. However, a mobile terminal served by high gain beam antennas requires a high bandwidth to provide the control data required for the feedback loop, to the disadvantage of the payload capacity of the radio connection. Further, the dynamic tracking bears the risk of sudden loss of signal, due to sudden blocking effects, more drastic if high antenna gains are used.

Typically, beam tracking approaches are either fully adaptive or switched. In both cases channel state estimation (CSE) is typically used. A switched approach uses patterns gathered in a codebook where tracking does a more or less brute-force search for the best beam forming vector. The processing time depends on codebook size and might become quite long in particular when beams are very narrow as required. It may work sufficiently well in full static usage scenarios like backhaul/front haul. However, it typically fails in case of time variant channels and presence of unpredictable blockage. For example, one implementation using codebooks takes around 45 ms beam searching time, where beam scanning range is limited to 60 degree in azimuth and half power beam width (HPBW) is about 10 degree for each radiation pattern.

According to another implementation subspaces are adaptively sampled and beams are searched that maximize reception SNR (signal to noise ratio) to outperform both the non-adaptive joint alignment and the single sided alignment in. Another approach is RT-based beam tracking promising to shorten the search time but adding plenty of real-time (RT) processing complexity.

However, all of these beam tracking approaches may not be sufficient to keep pace with channel dynamics and ensure that the beam tracking is satisfactorily good enough to deliver a needed throughput.

In the following, an approach is described which allows adapting online a beam tracking between a transmitter and a transmitter according to link budget needs (e.g. a required reception level or quality), for example ensuring a minimum required signal level and maintaining a certain service quality (e.g. in terms of data throughput) of the a radio link (i.e. a radio connection). This is done by altering antenna characteristics (in terms of directivity) which allows relaxing the requirements with respect to the quality of the beam tracking and for example allows subsequently reducing the tracking speed and signaling bandwidth of the beam tracking feedback control loop.

Figure 4:
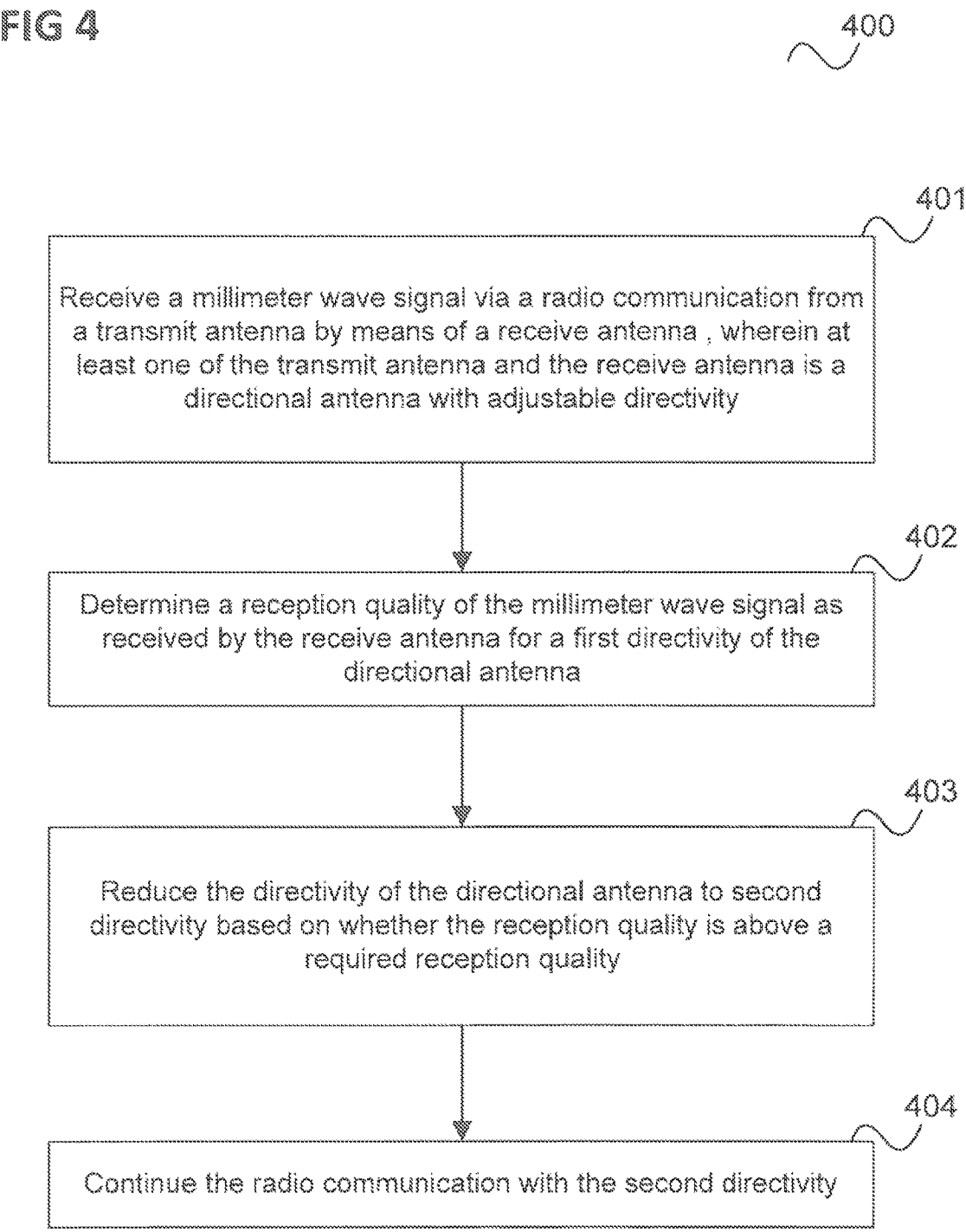
FIG. 4 shows a flow diagram illustrating a method for radio communication.

FIG. 4 shows a flow diagram 400 illustrating a method for radio communication, for example performed by a communication arrangement.

In 401, the communication arrangement receives a millimeter wave signal via a radio communication from a transmit antenna by means of a receive antenna, wherein at least one of the transmit antenna and the receive antenna is a directional antenna with adjustable directivity (i.e. adjustable antenna gain).

In 402, the communication arrangement determines a reception quality of the millimeter wave signal as received by the receive antenna for a first directivity (i.e. a first gain) of the directional antenna (e.g. by performing a reception quality measurement of the millimeter wave signal received by the receive antenna).

In 403, the communication arrangement reduces the directivity of the directional antenna to a second directivity (i.e. reduces the gain of the directional antenna to a second gain) based on whether the reception quality is above a required reception quality.

In 404, the communication arrangement continues the radio communication with the second directivity.

Figure 5:
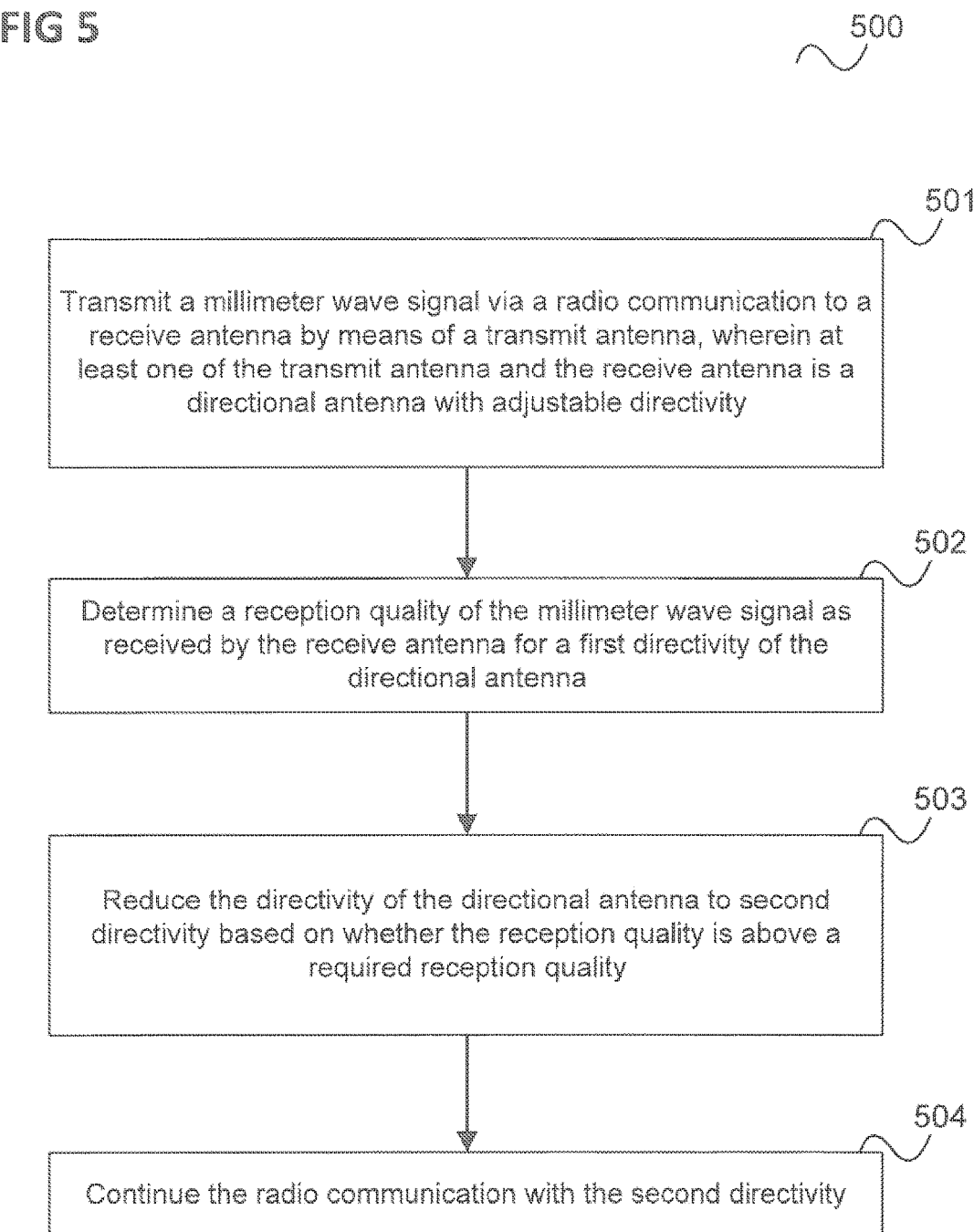
FIG. 5 shows a flow diagram illustrating a method for radio communication.

FIG. 5 shows a flow diagram 500 illustrating a method for radio communication, for example performed by a communication arrangement.

In 501, the communication arrangement transmits a millimeter wave signal via a radio communication to a receive antenna by means of a transmit antenna, wherein at least one of the transmit antenna and the receive antenna is a directional antenna with adjustable directivity (i.e. adjustable antenna gain).

In 502, the communication arrangement determines a reception quality of the millimeter wave signal as received by the receive antenna for a first directivity (i.e. a first gain) of the directional antenna (e.g. by performing a reception quality measurement of the millimeter wave signal received by the receive antenna).

In 503, the communication arrangement reduces the directivity of the directional antenna to a second directivity (i.e. reduces the gain of the directional antenna to a second gain) based on whether the reception quality is above a required reception quality.

In 504, the communication arrangement continues the radio communication with the second directivity.

In other words, a device (on the receiving side or the transmitting side) checks whether a directivity of an antenna used for a radio communication is unnecessarily high in terms of the achieved reception quality and relaxes the directivity (and thus the gain) of the antenna if the directivity is unnecessarily high. This in turn allows the relaxing the effort of the tracking between the transmit antenna and the receive antenna since when the directivity is reduced, the beam (e.g. the main lobe 305) gets wider such that the tracking can have reduced accuracy. For example the tracking operations (i.e. the update of the antenna directions, i.e. the antenna alignment or antenna gain pattern alignment) may be performed with longer time intervals between them and each tracking operation may be less accurate.

The directivity of an antenna may be understood as a figure of merit for the antenna measuring the power density the antenna radiates in the direction of its strongest emission, versus the power density radiated by an ideal isotropic radiator (which emits uniformly in all directions) radiating the same total power.

The gain may again be increased if it becomes necessary, e.g. if it is determined that the reception quality has fallen below the required reception quality.

Reducing the gain or the directivity may be understood as reducing the maximum gain or the maximum directivity of an antenna, e.g. reducing the gain achieved by the main lobe (i.e. the main transmitting direction in case of transmission or main reception direction in case of reception) of an antenna gain pattern.

For example, the approach described with reference to FIGS. 4 and 5 may be seen to exploit the fact that users (with communication terminals) may have different positions to a millimeter wave transmitter. A millimeter wave transmitter has a certain defined coverage area, defined by the maximum achievable link budget needed for a required minimum performance. The maximum range within this coverage area requires the maximum antenna gain (and thus maximum directivity), and thus the maximum feedback loop bandwidth (i.e. the most accurate tracking in terms of accuracy of each tracking operation and number of tracking operations per time period). This means in turn that all communication terminals with less propagation loss than the maximum propagation loss can achieve the required minimum performance with wider antenna beams and a reduced tracking effort.

Figure 6:
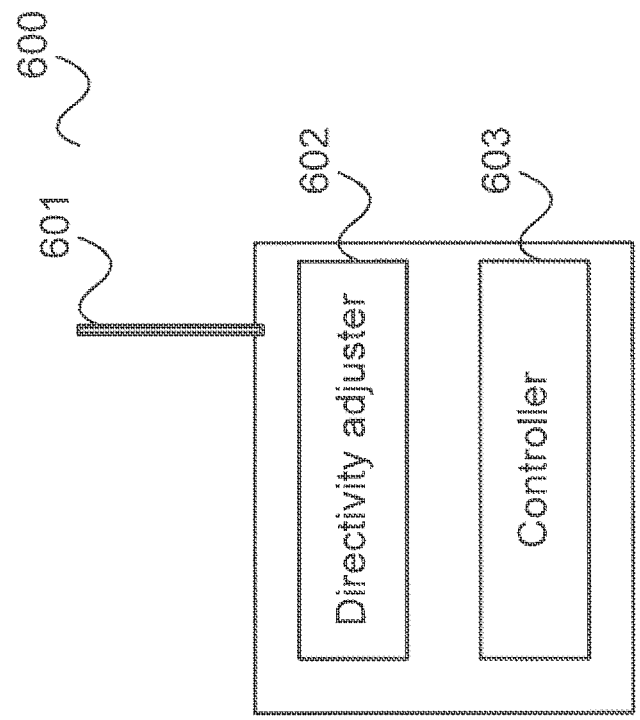
FIG. 6 shows a communication device.

The method illustrated in FIG. 4 may for example be performed by a communication device as illustrated in FIG. 6.

FIG. 6 shows a communication device 600.

The communication device 600 comprises a receive antenna 601 configured to receive a millimeter wave signal via a radio communication from a transmit antenna, wherein at least one of the transmit antenna and the receive antenna 601 is a directional antenna with adjustable directivity.

The communication device 600 further comprises a directivity adjuster 601 configured to determine a reception quality of the received millimeter wave signal for a first directivity of the directional antenna and to reduce the directivity of the directional antenna to second directivity based on whether the reception quality is above a required reception quality.

Further, the communication device 600 comprises a controller 602 configured to control the radio communication to continue with the reduced directivity.

Figure 7:
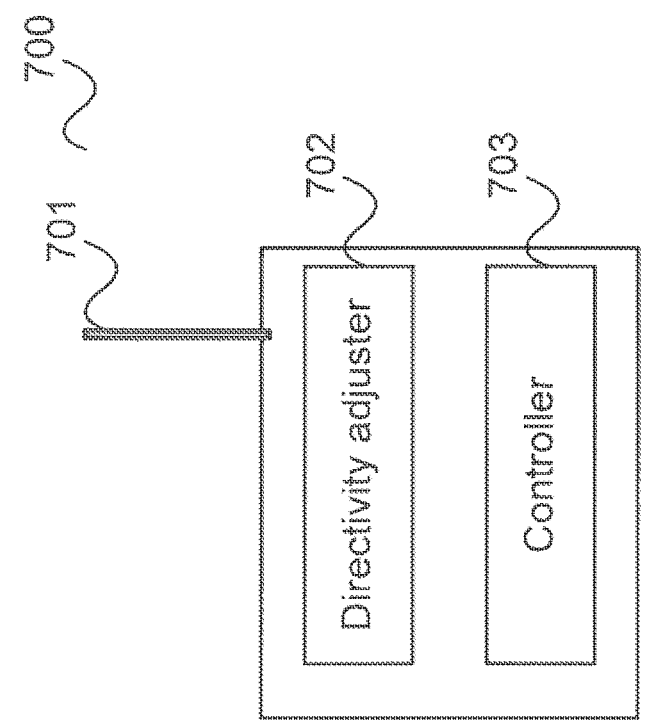
FIG. 7 shows a communication device.

FIG. 7 shows a communication device 700.

The communication device 700 comprises a transmit antenna 701 configured to transmit a millimeter wave signal via a radio communication to a receive antenna, wherein at least one of the transmit antenna 701 and the receive antenna is a directional antenna with adjustable directivity.

The communication device 700 further comprises a directivity adjuster 702 configured to determine a reception quality of the transmitted millimeter wave signal for a first directivity of the directional antenna and to reduce the directivity of the directional antenna to a second directivity based on whether the reception quality is above a required reception quality.

Further, the communication device 700 comprises a controller 703 configured to control the radio communication to continue with the reduced directivity.

The components of the communication devices 600, 700 (e.g. the directivity adjusters and the controllers) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The following examples pertain to further embodiments.

Example 1 is a method for radio communication as illustrated in FIG. 4.

In Example 2, the subject matter of Example 1 may optionally include at least one of the transmit antenna and the receive antenna being a mobile antenna of a mobile communication device and the method including tracking a direction between the transmit antenna and the receive antenna.

In Example 3, the subject matter of any one of Examples 1-2 may optionally include at least one of the transmit antenna and the receive antenna being a mobile antenna of a mobile communication device and the method including aligning the transmit antenna with the receive antenna.

In Example 4, the subject matter of Example 3 may optionally include the transmit antenna being a directional antenna and aligning the transmit antenna with the receive antenna comprising aligning a main transmit direction of the directional antenna with the position of the receive antenna.

In Example 5, the subject matter of any one of Examples 3-4 may optionally include the receive antenna being a directional antenna and aligning the transmit antenna with the receive antenna including aligning a main receive direction of the directional antenna with the position of the transmit antenna.

In Example 6, the subject matter of any one of Examples 4-5 may optionally include the method further including, if the directivity being reduced to a second directivity, reducing an effort of an alignment of the transmit antenna with the receive antenna.

In Example 7, the subject matter of Example 6 may optionally include reducing an effort of the alignment of the transmit antenna with the receive antenna including reducing an accuracy of the alignment of the transmit antenna with the receive antenna.

In Example 8, the subject matter of any one of Examples 6-7 may optionally include reducing an effort of the alignment of the transmit antenna with the receive antenna including reducing a radio communication data rate used for the alignment.

In Example 9, the subject matter of any one of Examples 6-8 may optionally include reducing an effort of the alignment of the transmit antenna with the receive antenna including reducing the frequency of occurrence of alignments of the transmit antenna with the receive antenna.

In Example 10, the subject matter of any one of Examples 1-9 may optionally include each of transmit antenna and receive antenna being a directional antenna and the method including reducing the directivity of at least one of the transmit antenna and the receive antenna based on whether the reception quality is above a required reception quality.

In Example 11, the subject matter of Example 10 may optionally include reducing the directivity of both the transmit antenna and the receive antenna based on whether the reception quality is above a required reception quality.

In Example 12, the subject matter of any one of Examples 1-11 may optionally include comparing the reception quality with the required reception quality and reducing the directivity of the directional antenna to the second directivity if the reception quality being above the required reception quality by a predetermined margin.

In Example 13, the subject matter of any one of Examples 1-21 may optionally include determining the second directivity such that the reception quality of a millimeter wave signal transmitted by the transmit antenna to the receive antenna with the second directivity being above the required reception quality.

In Example 14, the subject matter of any one of Examples 1-13 may optionally include one of the transmit antenna and the receive antenna being an antenna of a base station of a cellular communication system and the other being an antenna of a subscriber terminal of the cellular communication system.

In Example 15, the subject matter of any one of Examples 1-14 may optionally include at least one of the transmit antenna and the receive antenna being a mobile antenna of a mobile communication device and the method including tracking a distance between the transmit antenna and the receive antenna and reducing the directivity of the directional antenna to a second directivity based on the distance between the transmit antenna and the receive antenna.

In Example 16, the subject matter of Example 15, comprising reducing the directivity of the directional antenna to a second directivity based on whether the distance between the transmit antenna and the receive antenna is below a predetermined value.

In Example 17, the subject matter of any one of Examples 1-16 may optionally include the radio communication being a millimeter wave radio communication.

In Example 18, the subject matter of any one of Examples 1-17 may optionally include the reception quality being a bit error rate of the received millimeter wave signal, a reception field strength of the received millimeter wave signal or a received signal power of the received millimeter wave signal.

In Example 19, the subject matter of any one of Examples 1-18 may optionally include the directional antenna comprising plurality of antennas and the method comprising setting the directivity of the directional antenna by setting a phase shift between the antennas of the plurality of antennas.

Example 20 is a computer readable medium having recorded instructions thereon which, when executed by a processor, make the processor perform a method for radio communication according to any one of Examples 1-19.

Example 21 is a method for radio communication as illustrated in FIG. 5.

Example 22 is a communication device as illustrated in FIG. 6.

In Example 23, the subject matter of Example 22 may optionally include the communication device comprising a tracker configured to track a direction between the transmit antenna and the receive antenna.

In Example 24, the subject matter of any one of Examples 22-23 may optionally the communication device comprising an aligner configured to align the transmit antenna with the receive antenna.

In Example 25, the subject matter of Example 24 may optionally include the transmit antenna being a directional antenna and the aligner being configured to align a main transmit direction of the directional antenna with the position of the receive antenna.

In Example 26, the subject matter of any one of Examples 24-25 may optionally include the receive antenna being a directional antenna and the aligner being configured to align a main receive direction of the directional antenna with the position of the transmit antenna.

In Example 27, the subject matter of any one of Examples 25-26 may optionally include the aligner being configured to, if the directivity being reduced to a second directivity, reduce an effort of an alignment of the transmit antenna with the receive antenna.

In Example 28, the subject matter of Example 27 may optionally include reducing an effort of the alignment of the transmit antenna with the receive antenna including reducing an accuracy of the alignment of the transmit antenna with the receive antenna.

In Example 29, the subject matter of any one of Examples 27-28 may optionally include reducing an effort of the alignment of the transmit antenna with the receive antenna including reducing a radio communication data rate used for the alignment.

In Example 30, the subject matter of any one of Examples 27-29 may optionally include reducing an effort of the alignment of the transmit antenna with the receive antenna including reducing the frequency of occurrence of alignments of the transmit antenna with the receive antenna.

In Example 31, the subject matter of any one of Examples 22-30 may optionally include each of transmit antenna and receive antenna being a directional antenna and the directivity adjuster being configured to reduce the directivity of at least one of the transmit antenna and the receive antenna based on whether the reception quality is above a required reception quality.

In Example 32, the subject matter of Example 31 may optionally include the directivity adjuster being configured to reduce the directivity of both the transmit antenna and the receive antenna based on whether the reception quality is above a required reception quality.

In Example 33, the subject matter of any one of Examples 22-32 may optionally include the directivity adjuster being configured to compare the reception quality with the required reception quality and reduce the directivity of the directional antenna to the second directivity if the reception quality being above the required reception quality by a predetermined margin.

In Example 34, the subject matter of any one of Examples 22-33 may optionally include the directivity adjuster being configured to determine the second directivity such that the reception quality of a millimeter wave signal transmitted by the transmit antenna to the receive antenna with the second directivity being above the required reception quality.

In Example 35, the subject matter of any one of Examples 22-34 may optionally include one of the transmit antenna and the receive antenna being an antenna of a base station of a cellular communication system and the other being an antenna of a subscriber terminal of the cellular communication system.

In Example 36, the subject matter of any one of Examples 22-35 may optionally include the communication device including a tracker configured to track a distance between the transmit antenna and the receive antenna and the directivity adjuster being configured to reduce the directivity of the directional antenna to a second directivity based on the distance between the transmit antenna and the receive antenna.

In Example 37, the subject matter of Example 36 may optionally include the directivity adjuster being configured to reduce the directivity of the directional antenna to a second directivity based on whether the distance between the transmit antenna and the receive antenna is below a predetermined value.

In Example 38, the subject matter of any one of Examples 22-37 may optionally include the radio communication being a millimeter wave radio communication.

In Example 39, the subject matter of any one of Examples 22-38 may optionally include the reception quality being a bit error rate of the received millimeter wave signal, a reception field strength of the received millimeter wave signal or a received signal power of the received millimeter wave signal.

In Example 40, the subject matter of any one of Examples 22-39 may optionally include the directional antenna comprising plurality of antennas and the directivity adjuster being configured to set the directivity of the directional antenna by setting a phase shift between the antennas of the plurality of antennas.

Example 41 is a communication device as illustrated in FIG. 7.

It should be noted that one or more of the features of any of the examples above may be combined with any one of the other examples.

In the following, examples are described in more detail with reference to a cellular communication network as illustrated in FIG. 1.

It is assumed that the (first) base station 101 and the communication terminal 109 communicate using a millimeter radio connection 110. Further, it is assumed that the base station 101 signals (e.g. broadcasts) system information which contains a value for a minimum required service quality threshold (for example data throughput) for the radio connection 110. Additionally or alternatively to a generic system information service quality threshold, the base station 101 may set and signal (e.g. via RRC (Radio Resource Control) signaling) a user specific service quality threshold, i.e. a service quality threshold for the communication terminal 110. Either way, it is assumed that a (minimum) service quality threshold for the radio connection 110 is defined.

Figure 8:
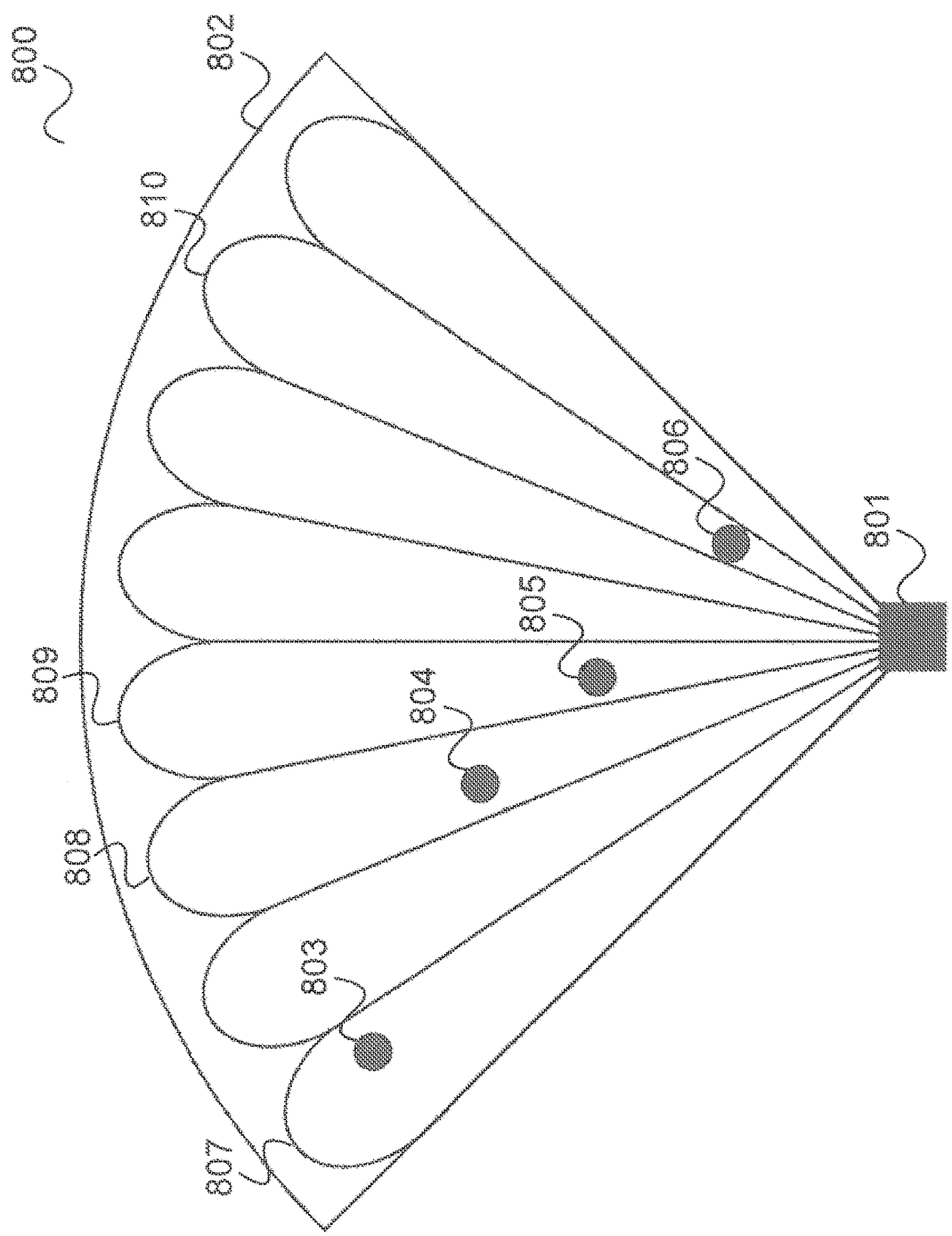
FIG. 8 illustrates a millimeter wave small cell.

FIG. 8 illustrates a millimeter wave small cell, i.e. a radio cell 800 for example corresponding to the (first) radio cell 105 via which the communication terminal 109 communicates with the first base station 101.

The radio cell 800 is operated by a millimeter wave small cell base station (BS) 801, e.g. corresponding to the base station 101, which is providing service for service area (coverage area) 802. Within the service area 802, multiple communication terminals 803 to 806 are located, wherein either one may for example correspond to the communication terminal 109. Each communication terminal 803 to 806 is served by a respective directed downlink (DL) beam 807 to 809 (and transmits in uplink (UL) with a corresponding uplink beam) which has a compound gain (composed of the transmit antenna gain times the receive antenna gain), improving the link budget according to equation (1).

In this example, the third communication terminal 803 is almost at the cell fringe, and is thus assumed to be in need of the maximum compound antenna gain to maintain the minimum service quality.

Each communication terminal 803 to 806 sends measurement reports of its experienced DL data channel signal quality (DL signal reception quality) to the millimeter wave small cell base station 801. The millimeter small cell base station 801 may in turn measure the experienced UL signal quality (e.g. based on the assumption that the compound gain of the DL beam corresponds to the compound gain of the UL beam). Based on these measurements, the base station 801 (or generally a radio communication controller located on the network side or possibly also at the terminal side) may determine the need of increased or decreased antenna gain based on a corresponding gain control algorithm. The algorithm may take into account additional parameters, e.g. an estimation of the distance between the base station 801 and the communication terminal 803 to 806 by delay time of signals exchanged between the base station 801 and the communication terminal 803 to 806, GPS data reporting by the communication terminal 803 to 806 representing its location or a UE fingerprint of the communication terminal 803 to 806 by monitoring other stations. For example, if the distance between the base station 801 and the communication terminal 803 to 806 is estimated as being large based on the additional parameters (as e.g. in case of the third communication terminal 803), the base station may avoid making the respective beam 807 to 810 wider (i.e. avoid reducing the directivity of the respective transmit antenna and receive antenna) even if the current signal reception quality is well above threshold since the base station 801 may expect a drop of reception quality because of the large distance.

In the example of FIG. 8, the fourth communication terminal 806 has less need for the maximum achievable antenna gains $G_T$ and $G_R$, because due to its short distance to the base station 101 its experienced pathloss $L_p$ is significantly lower than the maximum allowable pathloss $L_p^{max}$ achieved with maximum gains $G_T$ and $G_R$ and accordingly, the gain control algorithm may reduce one or both of the gains $G_T$ and $G_R$ (e.g. in addition to lowering the transmit power $P_T$ to save energy).

Lowering the antenna gains on the base station and communication terminal side results in a wider DL antenna beam 810 (and similarly a wider angular reception range). This allows less accurate tracking because a wider beam (and a wider angular reception range) lead to a lower need for optimal positioning of the beam 810 with respect to the position of the communication terminal fourth 806 because the compound gain is constant within a higher range around the optimal direction.

Figure 9:
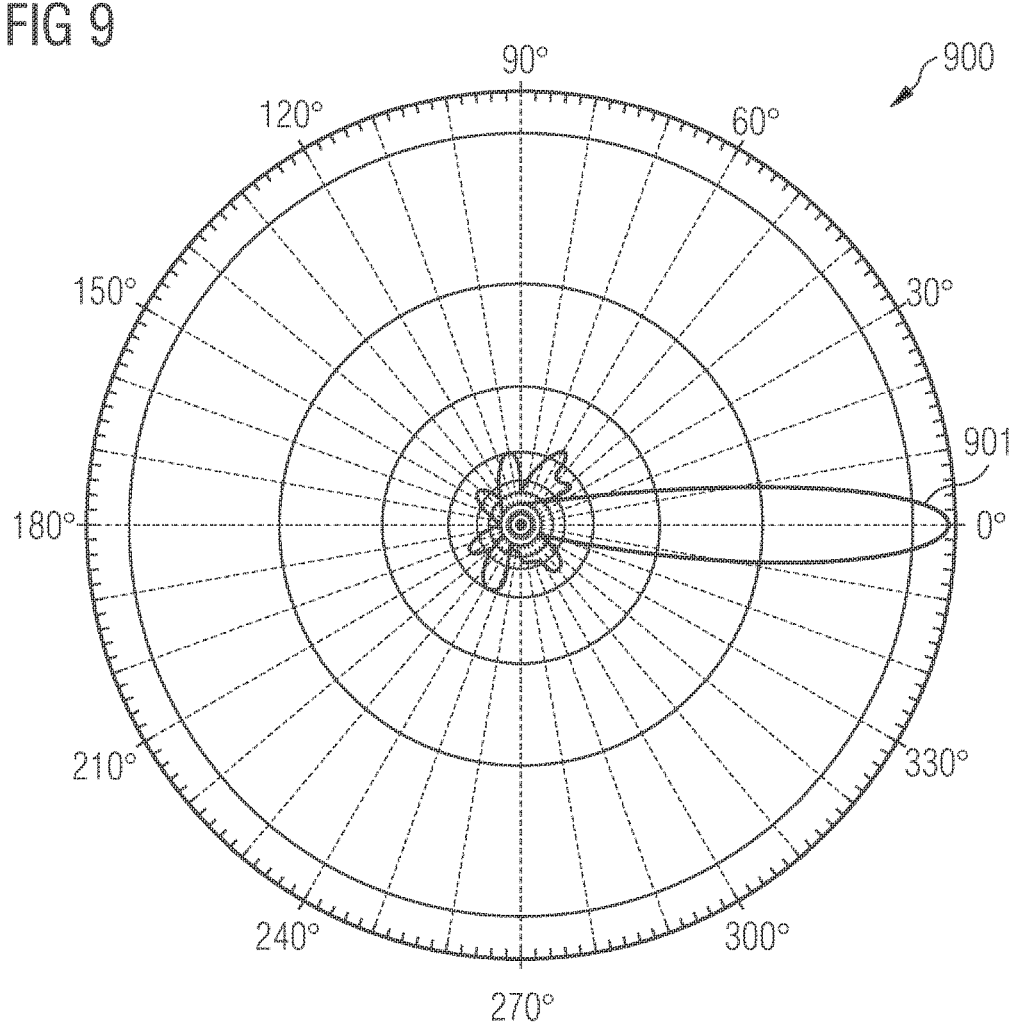
FIG. 9 shows an example of an antenna radiation pattern for a high gain antenna.
Figure 10:
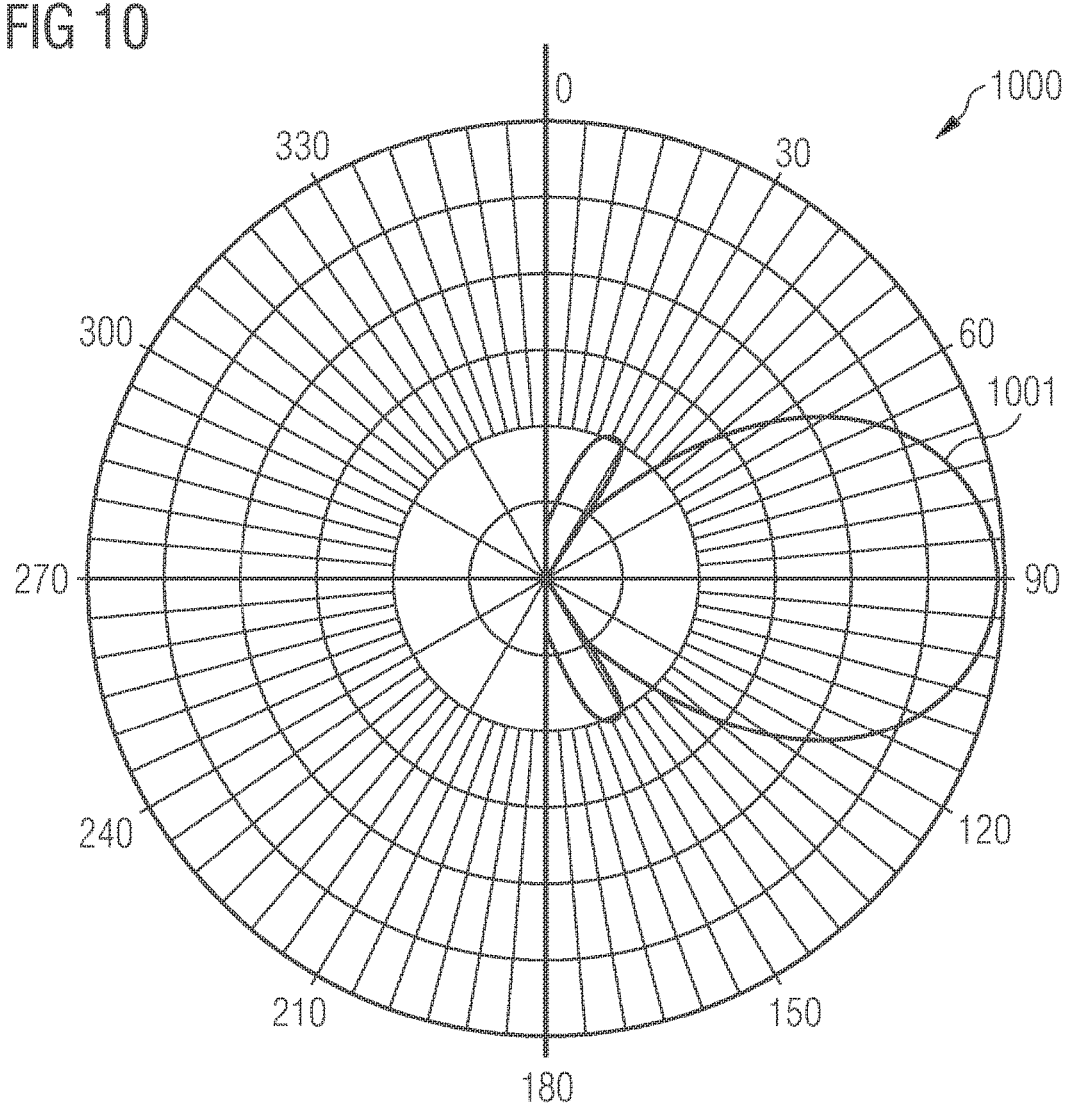
FIG. 10 shows an example of an antenna radiation pattern for a reduced gain antenna.

For example, the gain control algorithm, based on the determination that the reception quality at the fourth communication terminal 806 is unnecessarily high, reduces the directivity of the transmit antenna (e.g. corresponding to transmit antenna 303) of the base station 801 and the gain of the receive antenna (e.g. corresponding to receive antenna 304) of the fourth communication terminal 806 from a high directivity as illustrated in FIG. 9 to lower directivity as illustrated in FIG. 10.

FIG. 9 shows an example of an antenna radiation pattern (or antenna gain pattern) 900 for a high gain (high directivity) antenna. The antenna radiation pattern 900 has narrow main lobe 901.

FIG. 10 shows an example of an antenna radiation pattern 1000 for a reduced gain (reduced directivity) antenna. The antenna radiation pattern 1000 has a wide main lobe 1001.

In other words, the gain control algorithm (which may be performed on the network side, e.g. the base station, or also on the terminal side, which for example makes suggestions to the network to adjust the gain based on the results of the algorithm).

FIG. 11 shows an example for a message flow between a communication terminal (UE (user equipment, e.g. corresponding to the fourth communication terminal 806) and a base station 1101, e.g. corresponding to the base station 801.

In 1103, the base station 1102 transmits a downlink signal to the communication terminal 1101. It is assumed that the transmit antenna of the base station 1102 and the receive antenna of the communication terminal 1103 are set to a high gain as illustrated in FIG. 9.

In 1104, the communication terminal 1101 determines the reception quality of the received signal and compares it in 1105 with the predefined minimum required service quality threshold. If the reception quality is above the predefined minimum required service quality threshold, the UE 1101 reports this to base station 1102. Alternatively, the communication terminal 1101 may report the determined reception quality to the base station 1102 and the base station may perform the comparison 1105.

The base station may perform a gain control algorithm depending on the result of the comparison. For example, the gain control algorithm may determine that the antenna gains may be reduced, e.g. to a lower gain as illustrated in FIG. 10. Accordingly, in 1108, the base station 1102 may reduce its transmit antenna gain and may request, in 1109, the communication terminal 1101 to reduce its receive antenna gain. In response to the request, the communication terminal 1101 reduces its receive antenna gain in 1110.

Before the execution of the gain control algorithm, the communication terminal 1101 may for example inform the base station 1102 about its gain adjustment capabilities. Similarly, if the communication terminal 1101 performs the gain control algorithm and triggers a gain reduction, the base station 1102 may signal its gain adjustment capabilities to the communication terminal 1101.

If a transmitter receiver system such as the communication arrangement 300 the transmit antenna 303 and the receive antenna 304 have high directivity, as illustrated in FIG. 9, the antenna gain patterns (e.g. the main lobes 901, 1001 of the antenna gain patterns) need to be pointed to each other, which leads to a high tracking effort in a mobile scenario (e.g. with a highly mobile communication terminal as receiver 302). Therefore, the gain control algorithm, as described above, changes the antenna gain patterns (on the transmitter side, the receiver side or both, e.g. evenly distributed among the transmitter and the receiver) to a wider beam (i.e. to have a wider main lobe 901, 1001) if the link budget allows it. This relaxes the needs of having a high speed feedback loop pointing the antennas to each other, i.e. for tracking.

As a implementation of a millimeter wave directional antenna is typically composed by a multitude of exciting elements and individual phase shifters, such an antennas typically has the capability of a configurable (adjustable) directivity. Depending on the link budget needs of the receiver 302, the gain control algorithm adjusts the directivity of the antennas depending on the antenna implementation limits, e.g. more or less continuously or in a step function manner.

To support reporting and the gain control algorithm, the millimeter wave small cell base station 801 may additionally identify the possible antenna gain settings in a system information signaling element. Each communication terminal may report, e.g. in a UE capability information element, its possible antenna gain settings. The gain control (or gain adaptation) algorithm may take radio link quality reports, additional distance information, terminal and base station antenna capabilities into account, and select antenna gain settings for a sufficient link budget, achieving a wanted quality of service, wherein low antenna gain settings result in a more tolerable signaling latency and less bandwidth needs for the tracking signaling.

The approach described above, e.g. with reference to FIG. 4, may for example be applied in the context of massive MIMO (multiple input-multiple output) implementations for relay and millimeter wave enhanced mobile radio systems in heterogeneous deployment scenarios using millimeter wave technology for front-, backhaul and access links.

Generally, for example, a mobile radio system is provided including at least one base station and at least two mobile stations, whereas at least the base station, or the mobile station or both have antennas with adjustable gain, wherein beam tracking is adopted in accordance with the system configuration range (e.g. capabilities) and wherein an algorithm adjusting the gain of the antennas is performed. The algorithm may use a service threshold signaled as part of a system information broadcast message by the base station or in a user specific signaling message or both as input. The base station may for example signal its antenna gain adjustment capabilities to the mobile stations and the mobile stations may signal their antenna gain adjustment capabilities to the base station.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A method for radio communication, comprising:
receiving a millimeter wave signal via a radio communication from a transmit antenna by a receive antenna, wherein at least one of the transmit antenna and the receive antenna is a directional antenna with adjustable directivity;
determining a reception quality of the millimeter wave signal as received by the receive antenna for a first directivity of the directional antenna;
reducing the directivity of the directional antenna to a second directivity based on whether the reception quality is above a predetermined minimum reception quality, wherein the predetermined minimum reception quality is based on a predetermined minimum signal level and a predetermined minimum service quality threshold;
continuing the radio communication with the second directivity; and
aligning the transmit antenna with the receive antenna based on the second directivity,
wherein at least one of the transmit antenna and the receive antenna is a mobile antenna of a mobile communication device,
wherein a main transmit direction of the directional antenna is aligned with a position of the receive antenna or a main receive direction of the directional antenna is aligned with a position of the transmit antenna, and
wherein when the directivity is reduced to the second directivity, reducing an effort of an alignment of the transmit antenna with the receive antenna.

2. The method of claim 1, wherein the method includes tracking a direction between the transmit antenna and the receive antenna.

3. The method of claim 1, wherein the transmit antenna is the directional antenna and aligning the transmit antenna with the receive antenna comprises aligning the main transmit direction of the directional antenna with the position of the receive antenna.

4. The method of claim 1, wherein the receive antenna is the directional antenna and aligning the transmit antenna with the receive antenna comprises aligning the main receive direction of the directional antenna with the position of the transmit antenna.

5. The method of claim 1, wherein reducing an effort of the alignment of the transmit antenna with the receive antenna includes reducing an accuracy tolerance of the alignment of the transmit antenna with the receive antenna.

6. The method of claim 1, wherein reducing an effort of the alignment of the transmit antenna with the receive antenna includes reducing a radio communication data rate used for tracking the alignment.

7. The method of claim 1, wherein reducing an effort of the alignment of the transmit antenna with the receive antenna includes reducing a frequency of occurrence of alignments of the transmit antenna with the receive antenna.

8. The method of claim 1, wherein each of the transmit antenna and receive antenna is a directional antenna and the method includes reducing the directivity of at least one of the transmit antenna and the receive antenna based on whether the reception quality is above the predetermined minimum reception quality.

9. The method of claim 8, comprising reducing the directivity of both the transmit antenna and the receive antenna based on whether the reception quality is above the predetermined minimum reception quality.

10. The method of claim 1, comprising comparing the reception quality with the predetermined minimum reception quality and reducing the directivity of the directional antenna to the second directivity when the reception quality is above the predetermined minimum reception quality by a predetermined margin.

11. The method of claim 1, comprising determining the second directivity such that the reception quality of a millimeter wave signal transmitted by the transmit antenna to the receive antenna with the second directivity is above the predetermined minimum reception quality.

12. The method of claim 1, wherein one of the transmit antenna and the receive antenna is an antenna of a base station of a cellular communication system and the other is an antenna of a subscriber terminal of the cellular communication system.

13. The method of claim 1, wherein the method includes tracking a distance between the transmit antenna and the receive antenna and reducing the directivity of the directional antenna to the second directivity based on the distance between the transmit antenna and the receive antenna.

14. The method of claim 13, comprising reducing the directivity of the directional antenna to the second directivity based on whether the distance between the transmit antenna and the receive antenna is below a predetermined value.

15. The method of claim 1, wherein the reception quality is a bit error rate of the received millimeter wave signal, a reception field strength of the received millimeter wave signal or a received signal power of the received millimeter wave signal and a data throughput of the radio communication.

16. The method of claim 1, wherein the directional antenna comprises plurality of antennas and the method comprises setting the directivity of the directional antenna by setting a phase shift between the antennas of the plurality of antennas.

17. A method for radio communication, comprising:
transmitting a millimeter wave signal via a radio communication to a receive antenna by a transmit antenna, wherein at least one of the transmit antenna and the receive antenna is a directional antenna with adjustable directivity;
determining a reception quality of the millimeter wave signal as received by the receive antenna for a first directivity of the directional antenna;
reducing the directivity of the directional antenna to a second directivity based on whether the reception quality is above a predetermined minimum reception quality, wherein the predetermined minimum reception quality is based on a predetermined minimum signal level and a predetermined minimum service quality threshold;
continuing the radio communication with the second directivity; and
aligning the transmit antenna and the receive antenna based on the second directivity,
wherein at least one of the transmit antenna and the receive antenna is a mobile antenna of a mobile communication device,
wherein a main transmit direction of the directional antenna is aligned with a position of the receive antenna or a main receive direction of the directional antenna is aligned with a position of the transmit antenna, and
wherein when the directivity is reduced to the second directivity, reducing an effort of an alignment of the transmit antenna and the receive antenna.

18. A communication device, comprising:
a receive antenna configured to receive a millimeter wave signal via a radio communication from a transmit antenna, wherein at least one of the transmit antenna and the receive antenna is a directional antenna with adjustable directivity;
a directivity adjuster configured
  to determine a reception quality of the received millimeter wave signal for a first directivity of the directional antenna; and
  to reduce the directivity of the directional antenna to a second directivity based on whether the reception quality is above a predetermined minimum reception quality, wherein the predetermined minimum reception quality is based on a predetermined minimum signal level and a predetermined minimum service quality threshold;
a controller configured to control the radio communication to continue with the second directivity; and
an aligner configured to align the receive antenna with the transmit antenna,
wherein at least one of the transmit antenna and the receive antenna is a mobile antenna of a mobile communication device,
wherein the receive antenna is directional and a main receive direction of the receive antenna is aligned with a position of the transmit antenna, and
wherein when the directivity is reduced to the second directivity, reducing an effort of an alignment of the receive antenna with the transmit antenna.

19. The communication device of claim 18, comprising a tracker configured to track a direction between the transmit antenna and the receive antenna.

20. A communication device, comprising:
a transmit antenna configured to transmit a millimeter wave signal via a radio communication to a receive antenna, wherein at least one of the transmit antenna and the receive antenna is a directional antenna with adjustable directivity,
a directivity adjuster configured
  to determine a reception quality of the transmitted millimeter wave signal for a first directivity of the directional antenna; and
  to reduce the directivity of the directional antenna to a second directivity based on whether the reception quality is above a predetermined minimum reception quality, wherein the predetermined minimum reception quality is based on a predetermined minimum signal level and a predetermined minimum service quality threshold;
a controller configured to control the radio communication to continue with the second directivity; and
an aligner configured to align the transmit antenna with the receive antenna,
wherein at least one of the transmit antenna and the receive antenna is a mobile antenna of a mobile communication device,
wherein the transmit antenna is directional and a main transmit direction of the transmit antenna is aligned with a position of the receive antenna, and
wherein when the directivity is reduced to the second directivity, reducing an effort of an alignment of the transmit antenna with the receive antenna.

21. The method of claim 1, wherein the first directivity comprises a first antenna radiation pattern and the second directivity comprises a second antenna radiation pattern, wherein a main lobe of the second antenna radiation pattern is wider than a main lobe of the first antenna radiation pattern.

22. The method of claim 1, wherein the predetermined minimum signal level comprises a predetermined minimum received signal power level and the predetermined minimum service quality threshold comprises a predetermined minimum data throughput.

* * * * *